United States Patent [19]

Iwasaki et al.

[11] Patent Number: 5,338,912
[45] Date of Patent: Aug. 16, 1994

[54] AUTOMATIC BROKEN WIRE REPAIRING METHOD FOR WIRE ELECTRIC DISCHARGE MACHINING DEVICES

[75] Inventors: Takeshi Iwasaki; Takeshi Yatomi; Shigeaki Naka; Toshio Suzuki, all of Nagoya, Japan

[73] Assignee: Mitsubishi Denki Kabushiki Kaisha, Tokyo, Japan

[21] Appl. No.: 766,084

[22] Filed: Sep. 27, 1991

[30] Foreign Application Priority Data

Sep. 28, 1990 [JP] Japan .................. 2-257437

[51] Int. Cl.⁵ .............................. B23H 7/10
[52] U.S. Cl. .................. 219/69.12; 219/69.14
[58] Field of Search ............... 219/69.12, 69.17, 69.14

[56] References Cited

U.S. PATENT DOCUMENTS

| | | | |
|---|---|---|---|
| 3,987,270 | 10/1976 | Ullmann et al. | 219/69.12 |
| 4,338,505 | 7/1982 | Katsube et al. | 219/69.12 |
| 4,465,915 | 8/1984 | Corcelle | 219/69.12 |
| 4,547,647 | 10/1985 | Schneider | 219/69.12 |
| 5,001,321 | 3/1991 | Iwasaki et al. | 219/69.12 |
| 5,036,174 | 7/1991 | Iwasaki et al. | 219/69.12 |
| 5,045,662 | 9/1991 | Yamada | 219/69.12 |
| 5,055,649 | 10/1991 | Iwasaki et al. | 219/69.12 |
| 5,077,457 | 12/1991 | Onaka et al. | 219/69.12 |
| 5,138,126 | 8/1992 | Naka et al. | 219/69.12 |

FOREIGN PATENT DOCUMENTS

| | | |
|---|---|---|
| 371724 | 6/1990 | European Pat. Off. . |
| 8612557 | 12/1986 | Fed. Rep. of Germany . |
| 3926972 | 2/1990 | Fed. Rep. of Germany . |
| 63-256314 | 10/1980 | Japan .................. 219/69.12 |
| 63-28731 | 3/1981 | Japan . |
| 60-207726 | 10/1985 | Japan .................. 219/69.12 |
| 63-120034 | 5/1988 | Japan .................. 219/69.12 |
| 274926 | 11/1989 | Japan .................. 219/69.12 |

*Primary Examiner*—Geoffrey S. Evans
*Attorney, Agent, or Firm*—Rothwell, Figg, Ernst & Kurz

[57] ABSTRACT

A broken wire electrode 3 of a wire electrode electric discharge machining device is automatically repaired at the wire breaking position. After the used portion is cut away, the wire electrode 3 is fed toward the work 1. Upon detection of contact of the wire electrode 3 with the work 1, the feeding of the wire electrode 3 is stopped. A predetermined amount of deflection is obtained when the feeding of the wire electrode 3 is stopped. The wire electrode 3 is then moved horizontally relative to the work 1 within a predetermined range, until the end of the wire electrode 3 eventually falls into the machined groove 14 and the wire electrode 3 comes out of contact with the work 1. Thereafter the feeding of the wire electrode 3 is resumed to span the wire electrode 3 across the feeding-side wire guide unit 4 and the receiving-side wire guide unit 5. The attitude of the wire electrode 3 within the machined groove 14 is constrained downward by the water jet 7 sucked into the machining liquid nozzle 27 via the suction pump 30.

8 Claims, 7 Drawing Sheets

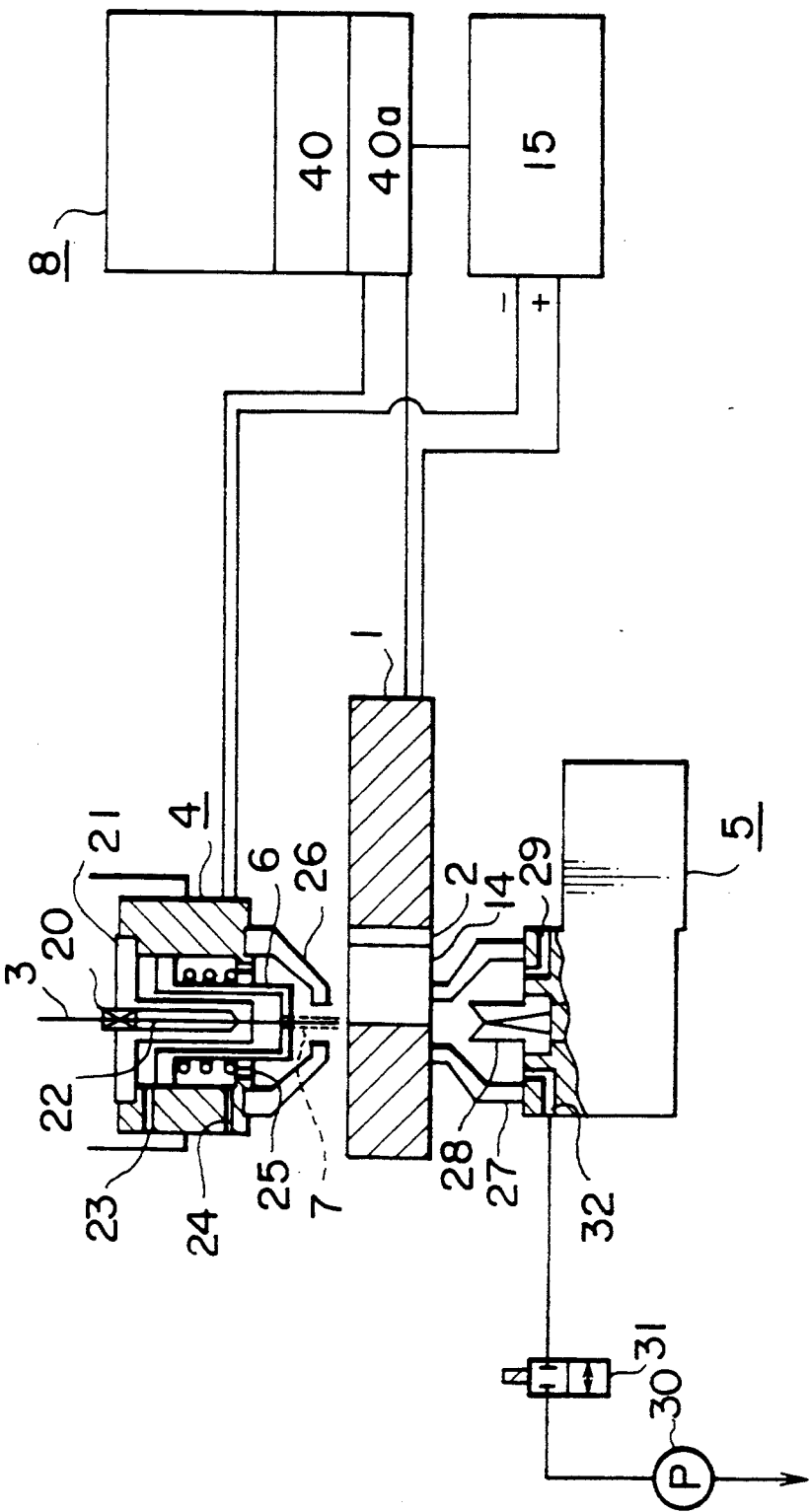

$P_0 \rightarrow P_1 \rightarrow P_5 \rightarrow$
$P_0 \rightarrow P_2 \rightarrow P_6 \rightarrow$
$P_0 \rightarrow P_3 \rightarrow P_7 \rightarrow$
$P_0 \rightarrow P_4 \rightarrow P_8 \rightarrow$
$P_0$

AUTOMATIC BROKEN WIRE REPAIRING METHOD FOR WIRE ELECTRIC DISCHARGE MACHINING DEVICES

BACKGROUND OF THE INVENTION

This invention relates to automatic repairing methods for a broken wire electrode of wire electrode electric discharge machining devices.

It is well known that the wire electrode electric discharge machining devices are capable of machining works of electrically conductive materials easily and precisely into complicated forms irrespective of the hardness of the works. The wire electrode, however, of the wire electrode electric discharge machining devices is thin, usually from about 0.03 mm to 0.3 mm in diameter, and is consumed by the discharge during the electrical discharge machining. Thus, the wire electrode may be broken by the tension applied thereto during the electrical discharge machining, and the machining may thus be interrupted. Thus, Japanese Patent Publication (Kokoku) No. 63-28731, for example, proposes an automatic repairing method of the wire electrode of the wire electrode electric discharge machining devices.

FIG. 10 shows a cross-section of a wire electrode electric discharge machining device by which the wire electrode is repaired according to the conventional method, and FIG. 11 is a schematic perspective view showing the trajectory of the wire electrode during the repairing of the wire electrode in accordance with the conventional repairing method. When the wire electrode 3 is broken, the numerical control device 8 drives the X- and Y-axis driving devices (not shown) to translate the work 1 via a XY machining table (not shown), such that the wire electrode 3 is moved from the wire breaking position 11 to the machining start position 12. When the wire electrode 3 is at the machining start position 12, a new length of the wire electrode 3 is fed from the feeding-side wire guide unit 4 to the receiving-side wire guide unit 5, while the water jet 7 is ejected from the port of the feeding-side wire guide unit 4. The wire electrode 3 fed from the wire electrode feeding mechanism of the feeding-side wire guide unit 4 is constrained by the water jet 7 to pass through the machining start hole 2 and the receiving-side wire guide to be reeled on a wire receiving mechanism or to be received into a container. The wire electrode 3 is thus spanned ready for the electrical discharge machining.

Thereafter, the wire electrode 3 is moved relative to the work 1 along the machining trajectory 13 within the machined groove 14 and is returned to the wire breaking position 11. Thereafter, the machining power source 15 is turned on, to generate the discharge energy and restart the electrical discharge machining of the work 1. This automatic repairing operation of the broken wire electrode may be repeated an indefinitely large number of times if the numerical control device 8 is so set. Generally, however, a predetermined upper limit is set such that the automatic repairing of the broken wire electrode is repeated up to that predetermined upper limit.

The above wire electrode electric discharge machining device thus is capable of automatic operation. However, the conventional repairing method still has a disadvantage. Namely, it often happens that the number of repairing operations of the wire electrode reaches the preset upper limit and intervention of a human operator becomes necessary.

The wire electrode 3 moves in the narrow machined groove 14 whose width is only about 0.02 mm to 0.08 mm greater than the diameter of the wire electrode 3. The width g of the machined groove 14, however, may become smaller than the diameter d of the wire electrode 3 along the machining trajectory 13 as indicated in FIG. 11, due to the deformation of the work 1 occasioned by the release of the interior stress, or due to the deviation, peculiar to the wire electrical discharge machining, of the machined groove from the target contour at the corners of the machined trajectory. When this is the case, the re-spanned wire electrode 3 cannot pass the narrow gap g of the machined groove 14, and may again be broken before reaching the wire breaking position 11. Under such circumstances, the broken wire is detected immediately at the wire breaking position 11 at the restart of the machining. The wire repairing operations are thus repeated only to be broken again at the narrow gap g until the number of repairing operations reaches the preset upper limit.

When the number of repairing operations reaches the predetermined limit, the repairing operations are no longer repeated. Thus, the machining is terminated, leaving a portion of the target trajectory unmachined. Alternatively, when the wire electrode electric discharge machining device is operated according to a program for machining a plurality of forms (trajectories) in the work 1 and the next form is set, the machining program proceeds to the machining of the next form, leaving a portion of the interrupted trajectory unmachined.

When the automatic machining is terminated leaving a portion of the target trajectory unmachined, a human operator must pass the wire electrode 3 through the machined groove 14 and the receiving-side wire guide unit 5 at the wire breaking position 11, and, after spanning the wire electrode 3, restart the electrical discharge machining by supplying the working liquid, moving the wire electrode 3, and turning on the machining power source 15.

In the case where a program for machining a plurality of forms are terminated leaving a portion of the interrupted trajectory unmachined, the operator must drive the device such that the wire electrode 3 is moved to the interrupted point without machining the work 1. When the wire electrode reaches the wire breaking position 11, or is moved to a point just before the wire breaking position 11 along the machining trajectory, the operator stops the device, and then restarts the electrical discharge machining after feeding and spanning the wire electrode and performing the necessary restarting operations, as described above. This operation is time-consuming and burdensome for the operator.

Since the wire electrode 3 cannot be moved along the machining trajectory 13 within the machined groove 14 and the automatic repairing operations fail as many times as they are tried, intervention of a human operator becomes necessary. Thus, according to the conventional repairing method, automatic machining for a prolonged length of time cannot be accomplished smoothly without operator's intervention.

Further, when the work 1 with an unmachined portion is left for a long time, rust develops in the machined groove 14, such that the wire electrode 3 tends to be broken more often than before after the restart of the machining by the operator. Then, due to repeated restarting operations, the width of the discharge gap exceeds the target value thereof by far, and the work 1 becomes defective.

Further disadvantage of the conventional wire repairing method is that it is time consuming even when the device is operated automatically without operator's intervention. Namely, when the wire electrode 3 is moved along the machined groove 14, the positional deviation (generally known as the droop of the wire electrode) becomes the greater as the velocity of the wire electrode 3 increases. Thus, when the wire electrode 3 is translated at a high velocity, the actual trajectory of the wire electrode 3 is greatly deviated from the target trajectory, such that the movement of the wire electrode 3 is interrupted by the surface of the machined groove 14 at the corners thereof and the wire electrode 3 is broken. Thus, the velocity of the movement of the wire electrode 3 is generally limited under 100 mm per minute. When the length of the machining trajectory is as long as several thousand millimeters, each repairing operation requires several tens of minutes. In such case, the conventional wire repairing method is thus extremely inefficient.

SUMMARY OF THE INVENTION

It is therefore an object of this invention to provide an automatic repairing method for a broken wire of a wire electrode electric discharge machining device, by which a broken wire electrode can be repaired automatically and swiftly with a high reliability even when the machined groove has a narrowed gap past which the wire electrode cannot be moved.

The above object is accomplished in accordance with the principle of this invention by a repairing method which comprises the steps of:

stopping an electrical discharge machining operation upon detection of an occurrence of breaking of a wire electrode;

feeding the wire electrode from a feeding-side wire guide unit to a receiving-side wire guide unit of the wire electrode electric discharge machining device at a breaking position of the wire electrode, to insert the wire electrode through a machined groove of a work near a machining front and to span the wire electrode across the feeding-side wire guide unit and the receiving-side wire guide unit; and turning on a machining power source and restarting the electrical discharge machining, Preferably, the above feeding step comprises the steps of:

(a) judging whether or not the wire electrode comes into contact with the work 1 during a time in which the wire electrode is fed toward the work by a predetermined length from a commencement of feeding;

(b) in the case where it is judged that the wire electrode does not come into contact with the work in stop (a), feeding further the wire electrode to span the wire electrode across the feeding-side wire guide unit and the receiving-side wire guide unit;

(c) stopping the feeding of the wire electrode upon detection of contact of the wire electrode with the work in step (a), such that the wire electrode is stopped with a predetermined amount of deflection;

(d) after step (c), moving the wire electrode relative to the work within an predetermined range, to insert a lower end of the wire electrode into the machined groove, thereby bringing the wire electrode out of contact with the work; and (e) after step (d), upon detection of the wire electrode coming out of contact from the work, further feeding the wire electrode to span the wire electrode across the feeding-side wire guide unit and the receiving-side wire guide unit.

It is further preferred that a liquid supplied to the feeding-side wire guide unit is sucked to the receiving-side wire guide unit via the machined groove of the work during said feeding step, such that an attitude of the wire electrode is constrained by a flow of the liquid within the machined groove of the work.

Further, the wire electrode is preferably moved by a predetermined length toward a direction opposite to a machining direction along a machining trajector, before said feeding step of the wire electrode.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 1 shows a cross-section of a wire electrode electric discharge machining device the wire electrode of which is repaired in accordance with the this invention;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 10:
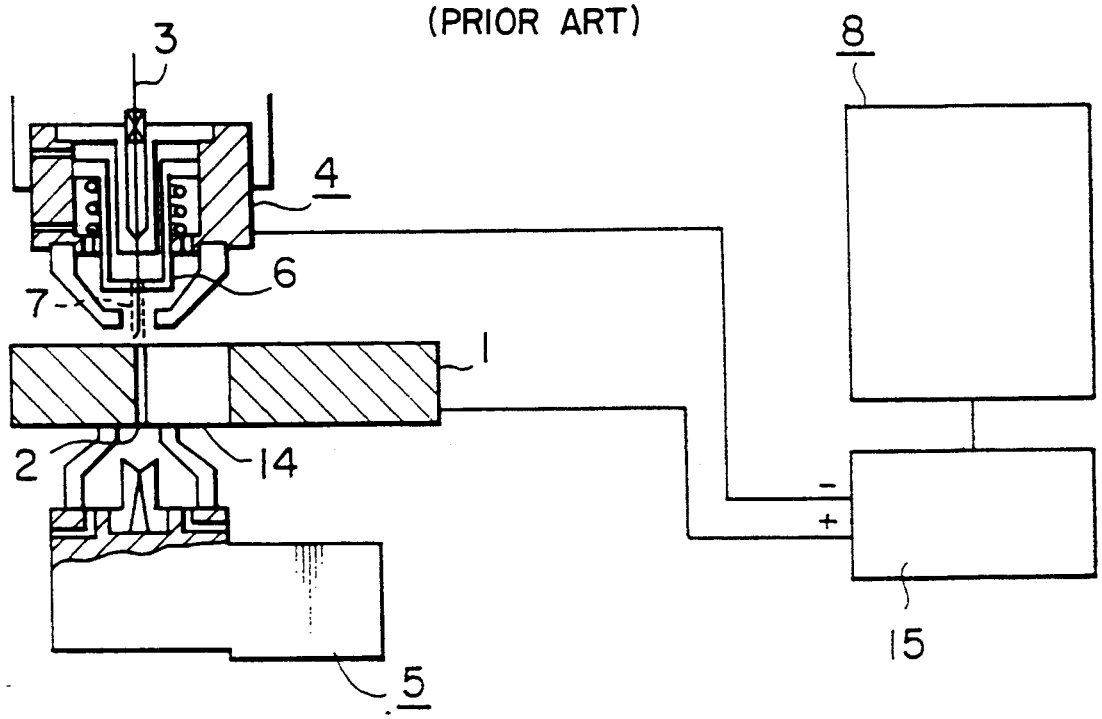
FIG. 10 shows a cross-section of a wire electrode electric discharge machining device by which the wire electrode is repaired according to the conventional method.
Figure 11:
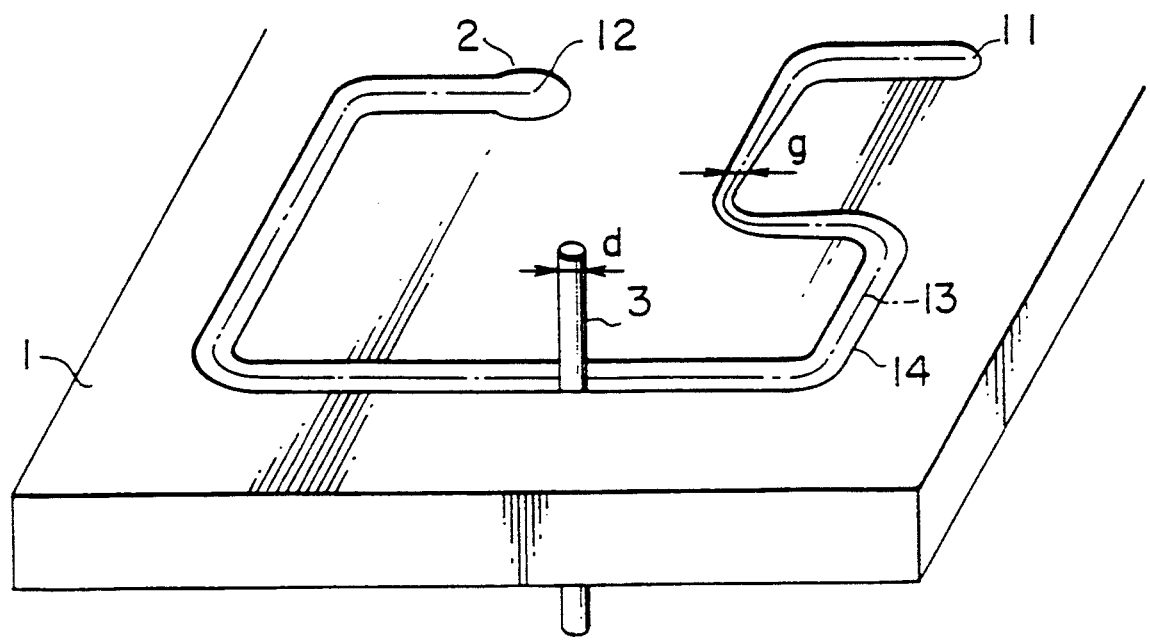
FIG. 11 is a schematic perspective view showing the trajectory of the wire electrode during the repairing of the wire electrode in accordance with the conventional repairing method.

FIG. 1 shows a cross-section of a wire electrode electric discharge machining device the wire electrode of which is repaired in accordance with the this invention. In FIG. 1, like reference numerals represent the same or corresponding parts as in FIGS. 10 and 11.

The wire electrode 3 is guided via a guide die 20 into the feeding-side wire guide unit 4. A disk-shaped feeding-side wire guide 21 mounted on the feeding-side wire guide unit 4 supports the die 20 and the wire electrode 3. A power supply member 22 is attached to the interior of the hollow cylindrical portion of the feeding-side wire guide 21 which extends downward from the center of the disk-shaped feeding-side wire guide 21. The wire electrode 3 is supported at both ends of the power supply member 22 via the guide die 20 at the top and via the bottom of the hollow cylindrical portion of the feeding-side wire guide 21 at the bottom, such that the wire electrode 3 is in tight contact with the notch formed on the power supply member 22.

The machining liquid supplied from a machining liquid supply unit (not shown) is introduced into the jet nozzle 6 via a machining liquid inlet port 23. Further, the machining liquid supplied via machining liquid inlet ports 24 and 25 is introduced into the machining liquid nozzle 26 during electrical discharge machining.

The receiving-side wire guide unit 5 includes a machining liquid nozzle 27 and a receiving-side wire guide 28. The machining liquid inlet port 29 supplies the machining liquid into the machining liquid nozzle 27. A suction pump 30 is coupled to the interior of the machining liquid nozzle 27 via a electromagnetic pump 31 and a machining liquid outlet port 32, to generate a suction and draw out the machining liquid from the interior of the machining liquid nozzle 27.

The numerical control device 8 includes a control unit 40 which consists of memories, gate-arrays, etc. The control unit 40 includes an electrode contact detector means 40a which is disclosed, for example, in Japanese Utility Model Publication (Kokai) No. 55-13417. One of the terminals of the electrode contact detector means 40a is coupled to the work 1, the other terminal of the electrode contact detector means 40a being coupled to the wire electrode 3 via the feeding-side wire guide unit 4 and the power supply member 22.

The wire repairing operation is effected in accordance with this invention as follows.

An occurrence of breaking of the wire electrode 3 is detected by the control unit 40. For example, a broken wire electrode detector means of a well-known type (not shown) includes a pulse generator (not shown) which is coupled, for example, to a pulley (not shown) disposed on the spanning path of the wire electrode 3 at the wire feeding side. The broken wire detector means counts the number of pulses generated by the pulse generator and compares the number of pulses with a predetermined reference value to determine an occurrence of breaking of the wire electrode. Upon detection of an occurrence of breaking of the wire electrode, the broken wire signal is outputted from the detector to the control unit 40.

In response thereto, the control unit 40 of the numerical control device 8 generates a command to cut the wire electrode 3. In response thereto, a wire electrode cutting mechanism (not shown), disclosed, for example, in Japanese Laid-Open Patent (Kokai) No. 60-80528, cuts the wire electrode 3 at the feeding side, and removes the cut-away portion of the wire electrode 3.

Next, the control unit 40 generates a command for feeding the wire electrode 3. In response thereto, a wire electrode feeding mechanism (not shown) begins to feed the wire electrode 3 toward the work 1. At the same time, the water jet 7 of from about 1 mm to 1.5 mm in diameter is ejected from the jet nozzle 6, such that the wire electrode 3 is fed toward the work 1 being constrained via the water jet 7.

Generally, the wire electrode 3 is kept on a feed bobbin for a long period of time and thus possesses a curling tendency. The curling tendency of the wire electrode 3 may further be generated by the plastic deformation during the drawing step thereof or by metallurgical causes. The fluid shearing force of the water jet 7 upon the wire electrode 3 is integrated along the length of the wire electrode 3 to the end thereof, and thus acts on the wire electrode 3 in the direction of flow, so as to correct this curling tendency of the wire electrode 3 and adjust the wire electrode 3 to the center of the water jet 7. However, this corrective force of the water jet 7 is insufficient for correcting the curling tendency of the wire electrode 3 at the end portion of the wire electrode 3, and the end of the wire electrode 3 is thus not necessarily positioned at the center of the water jet 7. Consequently, when the wire electrode 3 is fed toward the work 1, it is highly probable that the wire electrode 3, proceeding out of the machining liquid nozzle 26, comes into contact with the upper surface of the work 1, failing to fall right into the machined groove 14. Thus, in the case where the end of the wire electrode 3 does not proceed through the machined groove 14 and comes into contact with the upper surface of the work 1, an insertion operation for inserting the wire electrode 3 into the machined groove 14 is effected as follows.

First, the electrode contact detector means 40a detects an occurrence of contact of the wire electrode 3 with the work 1, and generates a contact detection signal. In response thereto, the control unit 40 stops feeding the wire electrode 3.

Figure 2A:
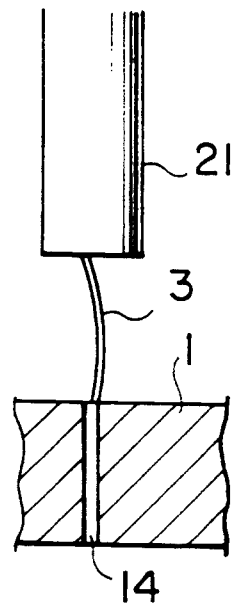
FIGS. 2a, 2b, 2c, 2d show the relative movement of the wire electrode with respect to the work for inserting the end of the wire electrode into the machined groove.

FIG. 2a shows the state where the feeding of the wire electrode 3 is stopped. The wire electrode 3 is deflected by a predetermined amount. The deflection of the wire electrode 3 is obtained intentionally by delaying the generation of the command for stopping the feeding of the wire electrode 3 by the control unit 40 after detection of the contact, or by the delay time inherent in the contact detection/command generation circuit. The deflection of the wire electrode 3 is necessary for the insertion operation. According to experiments conducted by the inventors, the amount of deflection is best from about 0.5 mm to 0.8 mm in the case where the gap between the bottom of the feeding-side wire guide 21 and the work 1 is 8 mm.

After the feeding of the wire electrode 3 is stopped as shown in FIG. 2a, the control unit 40 drives either or both of the X- and Y-axis driving devices (not shown) constituting the table driving mechanism, in order to move the work 1 via the X-Y cross table (not shown), and translates the wire electrode 3 relative to the work 1. As described above, FIG. 2a shows the wire electrode 3 in the state where the feeding thereof is stopped with its bottom end in contact with the upper surface of the work 1 at the right side of the machined groove 14.

Figure 2B:
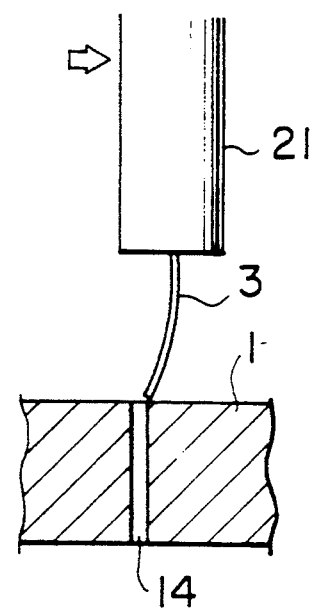
Figure 2C:
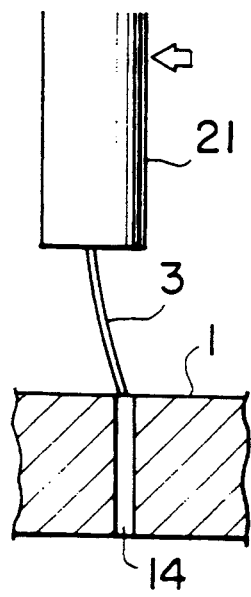
Figure 2D:
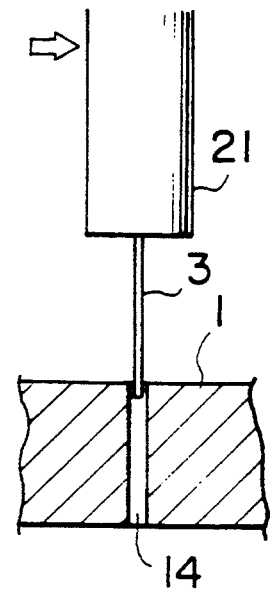

The wire electrode 3 is moved to the right as shown in FIG. 2b, and then to the left as shown in FIG. 2c, such that the end of the wire electrode 3 moves to the right and then to the left upon the upper surface of the work 1. Thus, the end of the wire electrode 3 eventually falls into the machined groove 14 as shown in FIG. 2d. The wire electrode 3 is also moved backward and forward to ensure that the end of the wire electrode 3 eventually falls into the machined groove 14.

Figure 3A:
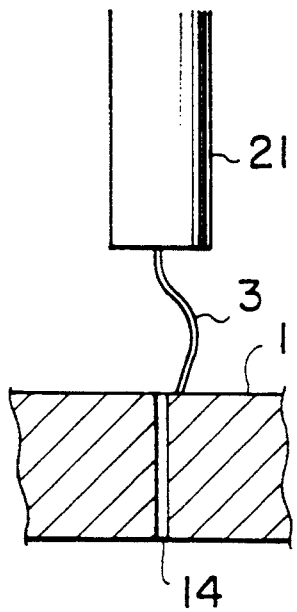
FIGS. 3a, 3b, 3c show the failure of insertion of the wire electrode into the machined groove in the case where the deflection of the wire electrode is too great.
Figure 3B:
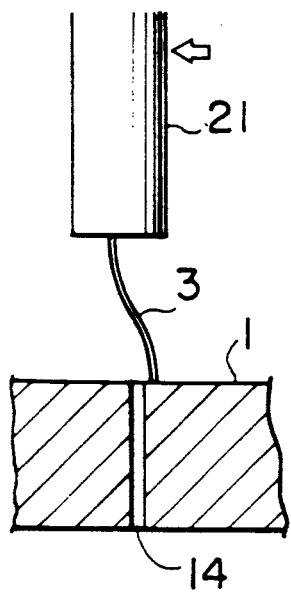
Figure 3C:
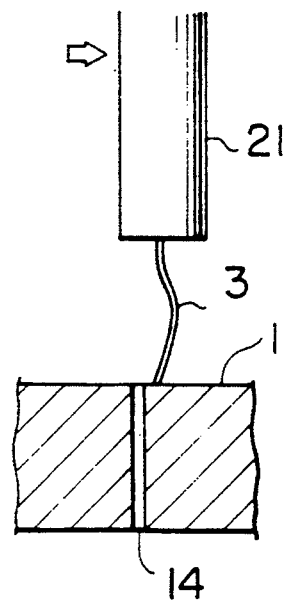

In this connection, the deflection of the wire electrode 3 must be kept within a predetermined range, since, if the deflection of the wire electrode 3 is too great, the end of the wire electrode 3 may be trapped in a small recess on the upper surface of the work 1, as shown in FIGS. 3a through 3c, and, if the deflection is too small, the force urging the end of the wire electrode 3 onto the upper surface of the work 1 is too weak such that the end of the wire electrode 3 easily comes out of contact with the upper surface of the work 1 and hence the determination whether or not the end of the wire electrode 3 has fallen into the machined groove 14 becomes difficult.

Figure 4A:
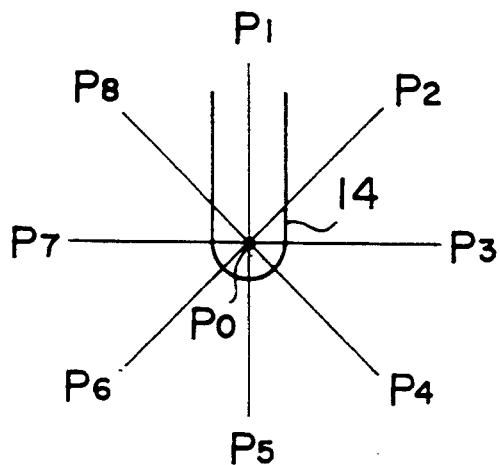
FIGS. 4a, 4b, display a schematic plan view showing the preferred trajectories of the wire electrode in the insertion operation.
Figure 4B:
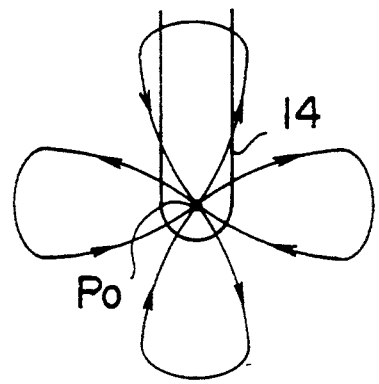

Further, preferably the relative movement of the wire electrode 3 with respect to the machined groove 14 is effected within a predetermined range, such that the end of the wire electrode 3 which has fallen into the machined groove 14 does not come out of the machined groove 14 again by the further relative movement of the wire electrode 3. According to the experiments conducted by the inventors, the preferred range of relative movement of the wire electrode 3 with respect to the machined groove 14 after the feeding of the wire electrode 3 is stopped is from about 1 mm to 2 mm where the gap between the feeding-side wire guide 21 and the work 1 is 8 mm. It is further preferred that the wire electrode 3 is moved relative to the work 1 in a plurality of directions, such that the end of the wire electrode 3 eventually falls into the machined groove 14 irrespective of the relative direction, with respect to the machined groove 14, of the wire electrode 3 at which the feeding of the wire electrode 3 has been stopped. For example, as shown in FIG. 4a, the wire electrode 3 may be moved from the stop position $P_0$ along the trajectory $P_0$-$P_1$-$P_5$-$P_0$-$P_2$-$P_6$-$P_0$-$P_3$-$P_1$-$P_0$-$P_0$-$P_4$-$P_8$, or along the four-leaved trajectory shown in FIG. 4b.

When the end of the wire electrode 3 is successfully inserted into the machined groove 14, the wire electrode 3 comes out of contact with the work 1. Upon detecting the wire electrode 3 coming out of contact with the work 1, the electrode contact detector means 40a generates a non-contact signal which indicates that the wire electrode 3 has been inserted into the machined groove 14.

In response to this non-contact signal, the control unit 40 stops the X- and Y-axis driving devices. After the insertion of the wire electrode 3 is thus completed, the wire electrode 3 is further fed toward the receiving-side wire guide unit 5. It must be noted, however, that if the wire electrode 3 is fed forward without any constraint, the wire electrode 3 does not necessarily proceed vertically downward within the machined groove 14, since the wire electrode 3 has a curling tendency as described above. Thus, the end of the wire electrode 3 may go out of the receiving-side wire guide 28.

Thus, according to this embodiment, at the same time the feeding of the wire electrode 3 is restarted, the suction pump 30 is turned on and the electromagnetic pump 31 is opened, to generate a suction within the machining liquid nozzle 27. Since the top open end of the machining liquid nozzle 27 is at an extreme proximity to the lower surface of the work 1 (for example, within 0.1 mm), the interior of the machining liquid nozzle 27 is virtually sealed. Thus, the suction generated within the machining liquid nozzle 27 produces suction within the machined groove 14, such that the water jet 7 flowing into the machined groove 14 is sucked into the machining liquid nozzle 27. The flow of the water jet 7 thus produced effectively constrains the attitude of the wire electrode 3 downward such that the wire electrode 3 is fed vertically downward into the receiving-side wire guide 28 within the machining liquid nozzle 27.

Prior art such as Japanese Laid-Open Patent (Kokai) No. 57-21232 discloses that the end of the wire electrode may be guided into a machining start hole of a small diameter by sucking the wire electrode together with the machining liquid into a nozzle at the lower side of the work. The inventors of the present invention have found that the above suction is effective in controlling the attitude of the wire electrode when the wire electrode 3 proceeds within the machined groove 14 at the wire breaking position.

Figure 5:
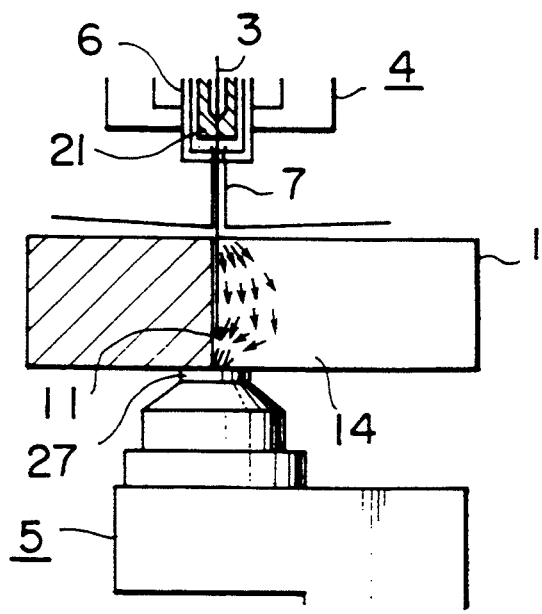
FIG. 5 shows an experimental model made of transparent acrylic resin block for visualizing the behavior the wire electrode and the flow of the water jet during the insertion operation according to this invention.

FIG. 5 shows an experimental model made of transparent acrylic resin block for visualizing the behavior of the wire electrode and the flow of the water jet during the insertion operation according to this invention. The experiment has been conducted while the water jet is sucked via the suction pump 30. As shown in FIG. 5, where the machined groove 14 extends toward the left in the figure (toward the direction opposite to the machining direction), the water jet 7 collides against the upper surface of the work 1 and a greater part thereof is splashed away to the sides of the machined groove 14 (to the left and to the right as represented in the figure). A portion of the water jet 7, however, flows into the machined groove 14 as represented by the arrows in FIG. 5. Near the upper surface of the work 1, the water jet 7 is directed away from the machining front (toward left in the figure) since it is blown onto an area of the upper surface of the work 1 containing the machined groove 14 and the solid portion of the work 1. Toward the center of the thickness of the work 1, the water jet 7 is rapidly decelerated since the water jet 7 passes through a narrow gap of the machined groove 14, and gradually changes direction toward vertically downward. Toward the lower surface of the work 1, the flow of the water jet 7 is converged to the opening of the machined groove 14 to which the machining liquid nozzle 27 is adjacent, due to the suction acting from the machining liquid nozzle 27.

Figure 6A:
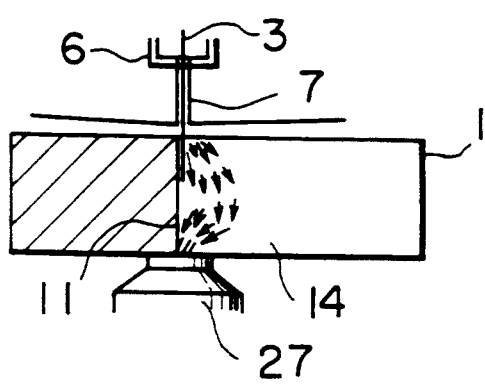
FIGS. 6a, 6b shows the attitude correcting effect of the water jet for the wire electrode within the machined groove in the experiment of FIG. 5.
Figure 6B:
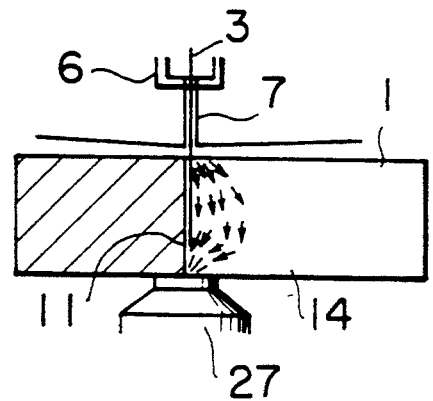

As shown in FIGS. 6a and 6b, even if the wire electrode 3 deviates within the machined groove 14 from the vertical downward direction due to the curling tendency thereof, the end of the wire electrode 3 is constrained to the vertical downward direction near the lower opening of the work 1 by the flow sucked into the opening of the machining liquid nozzle 27. Further, the suction generated by the suction pump 30 within the machining liquid nozzle 27 produces a suction within the machined groove 14 directed downward, such that the wire electrode 3 is urged by the atmospheric pressure from above and thus is further constrained to a vertically right attitude.

After thus proceeding vertically out of the machined groove 14, the wire electrode 3 passes right through the receiving-side wire guide 28 within the machining liquid nozzle 27, and is reeled on a well-known wire electrode receiving mechanism, or accommodated within a predetermined container, such that the wire electrode 3 is ready for the electrical discharge machining. By the way, since the wire electrode 3 easily is prone to come into contact with the work 1 after the wire electrode 3 is inserted into the machined groove 14, the feeding of the wire electrode 3 is continued after the feeding of the wire electrode 3 is restarted, disregarding the output signal of the electrode contact detector means 40a.

Thus, the wire electrode 3 is spanned across the feeding-side wire guide unit 4 and the receiving-side wire guide unit 5. Next, the control unit 40 generates a command to a machining liquid supply device (not shown). In response thereto, the machining liquid is ejected from both the machining liquid nozzles 26 and 27. Further, the horizontal relative movement of the wire electrode 3 with respect to the work 1 is restarted, and the machining power source 15 is turned on, to restart the electrical discharge machining.

Figure 7:
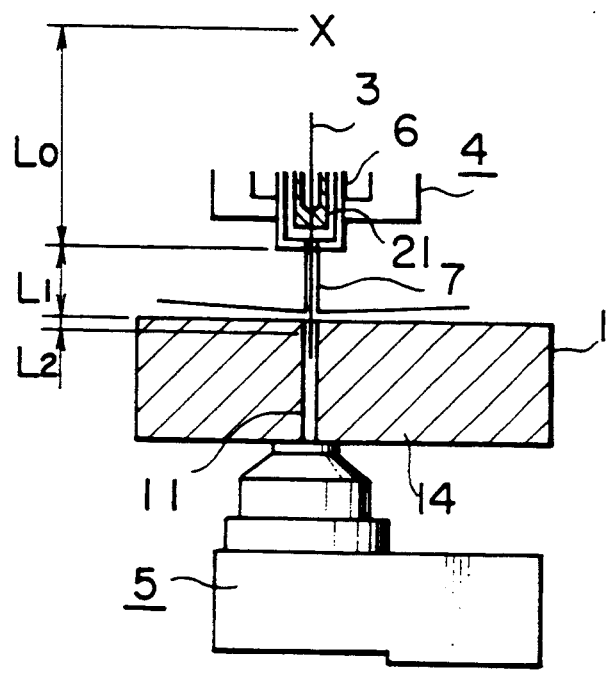
FIG. 7 shows the insertion operation of the wire electrode 3 where the wire electrode is inserted directly into the machined groove without coming into contact with the upper surface of the work.

In the above insertion operation of the wire electrode 3, the end of the wire electrode 3 may be inserted into the machined groove 14 right at the beginning of the insertion operation, the end of the wire electrode 3 not coming into contact with the upper surface of the work 1. FIG. 7 shows the insertion operation of the wire electrode 3 where the wire electrode is inserted directly into the machined groove without coming into contact with the upper surface of the work. When the curling tendency of the wire electrode 3 is small, or when the length of the wire electrode 3 inserted into the machined groove 14 is small, the probability that the wire electrode 3 does not come into contact with the work 1 is relatively high. Thus, when the length of insertion of the wire electrode 3 into the machined groove 14 reaches a preset length $L_2$ of about 1 mm to 2 mm without coming into contact with the work 1 after commencement of the feeding of the wire electrode 3, it is determined that the wire electrode 3 has been successfully inserted into the machined groove 14.

The determination whether or not the wire electrode 3 has been inserted into the machined groove 14 without contacting the upper surface of the work 1 is effected as follows. Within the memory of the control unit 40 is stored: the distance $L_0$ between the position (marked by X in FIG. 7) at which the wire electrode 3 has been cut and the bottom end of the jet nozzle 6; the gap $L_1$ between the jet nozzle 6 and the work 1; and the preset insertion length $L_2$ of the wire electrode 3 into the machined groove 14. These values may be inputted by the operator or stored in the control unit 40 as fixed values. On the other hand, the feeding length of the wire electrode 3 after the commencement of feeding thereof is determined, for example, by measuring the feeding time length, or by counting the number of pulses generated by a pulse generator coupled to a pulley, etc., on the wire spanning path at the wire feeding side. When a contact detection signal is not outputted from the electrode contact detector means 40a up to the time when the feeding length thus measured reaches the length L:

$$L=L_0+L_1+L_2$$

Then, it is judged that the wire electrode 3 is successfully inserted into the machined groove 14, and the feeding operation of the wire electrode 3 into the machined groove 14 as described above is continued disregarding the contact detection signal thereafter.

It may happen that the wire electrode 3 comes into contact with the work 1 during the time when the wire electrode 3 is fed by the length L, even though the wire electrode 3 is successfully inserted into the machined groove 14. In such case, the same operation as in the case where the wire electrode 3 comes into contact with the upper surface of the work 1 is effected. Since the end of the wire electrode 3 is inserted into the machined groove 14 by 1 mm to 2 mm at most, the wire electrode 3 comes out of contact at some point along the relative horizontal movement of the wire electrode 3 with respect to the work 1 as described above. Thus, upon detection of non-contact of the wire electrode 3, the feeding of the wire electrode 3 can be continued as described above.

Figure 8:
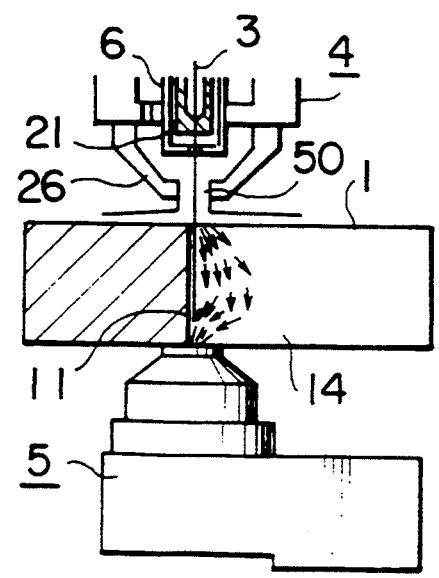
FIG. 8 shows a modified method of insertion of the wire electrode by which the machining liquid is supplied instead of the water jet.

By the way, in the case of the above embodiment, the water jet 7 keeps on being ejected during the time the wire electrode 3 passes through the machined groove 14 and proceeds to the receiving-side wire guide unit 5 after being inserted into the machined groove 14 of the work 1. However, as shown in FIG. 8, the machining liquid 50 may be supplied from the machining liquid nozzle 26 instead of the water jet 7, with substantially the same meritorious effects.

Further, in the case where the thickness of the work 1 is relatively small, for example, several tens of millimeters, the deviation of the wire electrode 3 from the vertical line due to its curling tendency is small. Then, the funnel-shaped guide surface of the receiving-side wire guide 28 opening upwardly is capable of catching the end of the wire electrode 3 even if the wire electrode 3 is not constrained. Thus, the feeding of the wire electrode 3 may be effected without suction of the water jet 7 or the machining liquid.

Figure 9A:
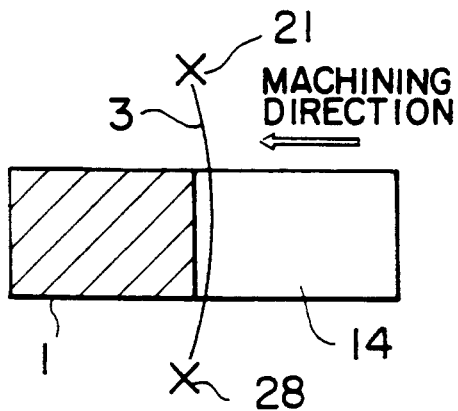
FIGS. 9a, 9b, 9c, 9d show the effect of the reaction of the discharge upon the wire electrode and preferred insertion position of the wire electrode after detection of the breaking of the wire electrode.
Figure 9B:
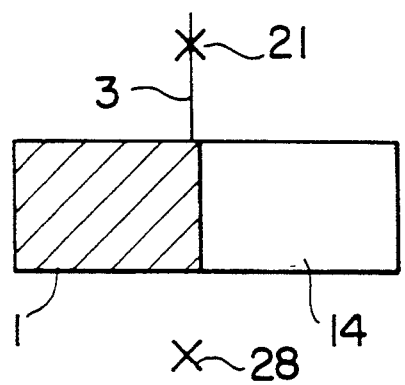
Figure 9C:
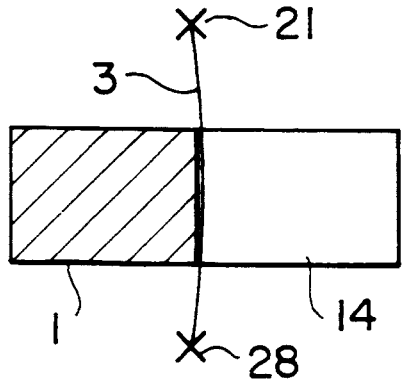

It is well known that the wire electrode 3 is deflected away from the machining front of the machined groove 14 (toward the direction opposite to the machining direction) due to the reaction of the electric discharge, as shown in FIG. 9a. Thus, the positions of the feeding-side wire guide 21 and the receiving-side wire guide 28 (marked by X's in FIG. 9) and the position of the wire electrode 3 at the time when the table driving mechanism is stopped upon detection of breaking of the wire electrode are horizontally displaced by a small amount. This displacement, which varies depending on the machining energy and the tension applied on the wire electrode 3 during the machining, etc., maybe as great as several hundred micrometers at the maximum. Thus, when the feeding of the wire electrode 3 is effected just above the wire electrode breaking position, the probability that the wire electrode 3 is not fed right down into the machined groove 14 is high, as shown in FIG. 9b. Further, when the wire electrode 3 is spanned straight over a predetermined path while the discharge reaction force does not act, the wire electrode 3 may come into contact with the machining front within the machined groove 14 of the work 1 as shown in FIG. 9c. Then, an appropriate gap necessary for effecting electrical discharge machining cannot be maintained between the wire electrode 3 and the work 1, and the discharge cannot be restarted. The continuation of the electrical discharge machining thus becomes impossible.

Figure 9D:
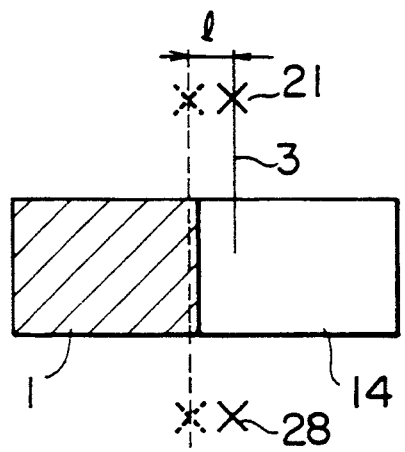

Thus, according to a second embodiment of this invention, the feeding of the wire electrode 3 is effected after first moving the wire electrode 3 away from the machining front as shown in FIG. 9d. Namely, before downward feeding of the wire electrode 3 toward the work 1 is made, the wire electrode 3 is first moved horizontally relative to the work 1 for a predetermined length l toward the direction opposite to the machining direction from the position (shown by a dotted line in FIG. 9d) at which the wire electrode 3 has been broken. Thus, the insertion of the wire electrode 3 can be effected with a high probability of success. The length l is a selected value sufficient for compensating for the horizontal displacement of the wire electrode 3 with respect to the feeding-side wire guide 21 and receiving-side wire guide 28 upon breaking of the wire electrode, as noted above, and also for obtaining an appropriate discharge gap between the wire electrode 3 and the machining front when the wire electrode 3 is spanned over the predetermined spanning path. Such length l is, for example, from about 0.1 mm to 1 mm. After the wire electrode 3 is thus spanned, the machining liquid is ejected, the wire electrode 3 is translated horizontally relative to the work 1, and the machining power source is turned on, to restart the electrical discharge machining. It is possible, however, for the purpose of obtaining a discharge gap between the wire electrode 3 and the work 1, that the feeding of the wire electrode 3 may be effected at the position at which the wire electrode 3 has been broken, and the electrical discharge machining may be resumed after the wire electrode 3 is moved relative to the work 1 in a direction opposite to the machining direction along the machining trajectory.

What is claimed is:

1. An automatic repairing method for a broken wire electrode of a wire electrode electric discharge machining device, comprising the steps of:
   stopping an electrical discharge machining operation upon detection of an occurrence of breaking of a wire electrode;
   feeding replacement wire electrode from a feeding-side wire guide unit to a receiving-side wire guide unit of said wire electrode electric discharge machining device at a breaking position of the broken wire electrode, to insert the replacement wire electrode through a machined groove of a workpiece near a machining front and to span the replacement wire electrode across the feeding-side wire guide unit to the receiving-side wire guide unit; and
   turning on a machining power source and restarting the electrical discharge machining;
   wherein said feeding step comprises the steps of;
   (a) judging whether or not the replacement wire electrode comes into contact with the workpiece during a time in which the replacement wire electrode is fed toward the workpiece by a predetermined length from a commencement of feeding;
   (b) in the case where it is judged that the replacement wire electrode does not come into contact with the workpiece in step (a), further feeding the replacement wire electrode to span the wire electrode across the feeding-side wire guide unit to the receiving-side wire guide unit;
   (c) stopping the feeding of the replacement wire electrode upon detection of contact of the replacement wire electrode with the workpiece in step (a), such that the wire electrode is stopped with a predetermined amount of deflection;
   (d) after step (c), moving the replacement wire electrode relative to the workpiece within a predetermined range, to insert a lower end of the wire electrode into said machined groove, thereby bringing the wire electrode out of contact with the workpiece; and
   (e) after step (d), upon detection of the wire electrode coming out of contact from the workpiece, further feeding the wire electrode to span the wire electrode across the feeding-side wire guide unit to the receiving-side wire guide unit.

2. An automatic repairing method for a broken wire electrode as claimed in claim 1, wherein said wire electrode is moved by a predetermined length toward a direction opposite to a machining direction along a machining trajectory, before said feeding step of the wire electrode.

3. An automatic repairing method for a broken wire electrode as claimed in claim 1, wherein said wire electrode is moved by a predetermined length toward a direction opposite to a machining direction along a machining trajectory, before said feeding step of the wire electrode.

4. An automatic repairing method for a broken wire electrode as claimed in claim 1, wherein said wire electrode is moved by a predetermined length toward a direction opposite to a machining-direction along a machining trajectory, before restarting the electrical discharge machining.

5. An automatic repairing method for a broken wire electrode of a wire electrode electric discharge machining device, comprising the steps of:
   stopping an electrical discharge machining operation upon detection of an occurrence of breaking of a wire electrode;
   feeding replacement wire electrode from a feeding-side wire guide unit to a receiving-side wire guide unit of the wire electrode electric discharge machining device at a breaking position of the broken wire electrode, to insert the replacement wire electrode through a machined groove of a workpiece near a machining front and to span the replacement wire electrode across the feeding-side wire guide unit to the receiving-side wire guide unit;
   wherein a liquid supplied to the feeding-side wire guide unit is sucked to the receiving-side wire guide unit via the machined groove of the workpiece during said feeding step, such that an attitude of the replacement wire electrode is constrained by a flow of the liquid within the machined groove of the workpiece; and
   turning on a machining power source and restarting the electrical discharge machining after said replacement wire electrode is spanned across the feeding-side wire guide unit to the receiving wire guide unit.

6. An automatic repairing method for a broken wire electrode as claimed in claim 5, wherein said wire electrode is moved by a predetermined length toward a direction opposite to a machining direction along a machining trajectory, before said feeding step of the wire electrode.

7. An automatic repairing method for a broken wire electrode of a wire electrode electric discharge machining device, comprising the steps of:
   stopping an electrical discharge machining operation upon detection of an occurrence of breaking of a wire electrode;
   feeding replacement wire electrode from a feeding-side wire guide unit to a receiving-side wire guide unit of the wire electrode electric discharge machining device at a breaking position of the broken wire electrode, to insert the replacement wire electrode through a machined groove of a workpiece near a machining front and to span the wire electrode across the feeding-side wire guide unit to the receiving-side wire guide unit;

wherein said replacement wire electrode is moved by a predetermined length toward a direction opposite to a machining direction along a machining trajectory, before said feeding step of the wire electrode; and turning on a machining power source and restarting the electrical discharge machining.

8. An automatic repairing method for a broken wire electrode of a wire electrode electric discharge machining device, comprising the steps of:

stopping an electrical discharge machining operation upon detection of an occurrence of breaking of a wire electrode;

feeding replacement wire electrode from a feeding-side wire guide unit to a receiving-side wire guide unit of the wire electrode electric discharge machining device at a breaking position of the broken wire electrode, to insert the replacement wire electrode through a machined groove of a workpiece near a machining front and to span the replacement wire electrode across the feeding-side wire guide unit to the receiving-side wire guide unit:

wherein said replacement wire electrode is moved by a predetermined length toward a direction opposite to a machining direction along a machining trajectory, before restarting the electrical discharge machine; and turning on a machining power source and restarting the electrical discharge machining.

* * * * *

UNITED STATES PATENT AND TRADEMARK OFFICE
CERTIFICATE OF CORRECTION

PATENT NO. : 5,338,912
DATED : August 16, 1994
INVENTOR(S) : Takeshi Iwasaki et al.

It is certified that error appears in the above-indentified patent and that said Letters Patent is hereby corrected as shown below:

Col. 3, line 56, "stop" should be -- step --;
Col. 7, line 44, "$P_0-P_1-P_5-P_0-P_2-P_6-P_0-P_3-P_1-P_0-P_0-P_4-P_8$" should be -- $P_0-P_1-P_5-P_0-P_2-P_6-P_0-P_3-P_7-P_0-P_0-P_4-P_8$ --.

Signed and Sealed this

Twenty-ninth Day of November, 1994

Attest:

BRUCE LEHMAN

*Attesting Officer*           *Commissioner of Patents and Trademarks*